US010112316B2

(12) United States Patent
Hsu et al.

(10) Patent No.: US 10,112,316 B2
(45) Date of Patent: Oct. 30, 2018

(54) STRAND ORIENTATION SYSTEM AND METHOD

(71) Applicant: Norbord Inc., Toronto (CA)

(72) Inventors: Wu Hsiung Ernest Hsu, Vancouver, WA (US); Jaime Antonio Costa, Maple Ridge (CA); Kenneth Kwok-Cheung Lau, Vancouver (CA)

(73) Assignee: Norbord Inc., Toronto (CA)

( * ) Notice: Subject to any disclaimer, the term of this patent is extended or adjusted under 35 U.S.C. 154(b) by 542 days.

(21) Appl. No.: 14/761,856

(22) PCT Filed: Jan. 17, 2014

(86) PCT No.: PCT/CA2014/000025
§ 371 (c)(1),
(2) Date: Jul. 17, 2015

(87) PCT Pub. No.: WO2014/110663
PCT Pub. Date: Jul. 24, 2014

(65) Prior Publication Data
US 2015/0360387 A1 Dec. 17, 2015

Related U.S. Application Data

(60) Provisional application No. 61/754,418, filed on Jan. 18, 2013.

(51) Int. Cl.
*B65G 23/00* (2006.01)
*B27N 3/14* (2006.01)

(52) U.S. Cl.
CPC ............ *B27N 3/143* (2013.01); *Y10T 156/10* (2015.01)

(58) Field of Classification Search
CPC ................................................ B27N 3/143
(Continued)

(56) References Cited

U.S. PATENT DOCUMENTS 4,058,201 A 11/1977 Etzold
4,380,285 A * 4/1983 Burkner ................ B27N 3/143 198/533
(Continued)

FOREIGN PATENT DOCUMENTS

CA 2191618 A1 6/1967
JP 2005053215 A 3/2005
(Continued)

OTHER PUBLICATIONS

"International Application Serial No. PCT/CA2014/000025, International Preliminary Report on Patentability dated Apr. 20, 2015", 5 pgs.
(Continued)

*Primary Examiner* — William R Harp
(74) *Attorney, Agent, or Firm* — Schwegman Lundberg & Woessner, P.A.

(57) ABSTRACT

A system for orienting strands (e.g., wood strands) includes multiple rotatable shafts that extend perpendicular to a travel direction of a mat of aligned strands. Each shaft can include axially spaced agitation members that extend radially away from the shaft, such as in a direction parallel to the travel direction. A vane set can be positioned vertically below the shafts. The vane set can include multiple partitions that define inter-partition spacings parallel to the travel direction. In an example, an inter-partition spacing of the vane set can be greater along a bottom portion of adjacent partitions than along a top portion of the same adjacent partitions. In an example, an upper edge thickness of a partition can be greater than a lower edge thickness of the same partition.

21 Claims, 13 Drawing Sheets

(58) Field of Classification Search
USPC .................................. 198/832, 533; 425/83.1
See application file for complete search history.

(56) References Cited

U.S. PATENT DOCUMENTS

| | | | | |
|---|---|---|---|---|
| 4,494,919 | A * | 1/1985 | Knudson ................ | B27N 3/143<br>19/296 |
| 5,325,954 | A * | 7/1994 | Crittenden ............ | B27N 3/143<br>198/382 |
| 5,404,990 | A | 4/1995 | Barnes et al. | |
| 5,487,460 | A | 1/1996 | Barnes | |
| 5,676,236 | A | 10/1997 | Barnes et al. | |
| 6,241,073 | B1 | 6/2001 | McAllister et al. | |
| 6,695,605 | B1 * | 2/2004 | Wirthel .................... | B27N 3/14<br>425/471 |
| 6,752,256 | B2 | 6/2004 | Knudson | |
| 8,197,732 | B2 | 6/2012 | Dagher et al. | |
| 8,241,025 | B2 | 8/2012 | Mannikko | |

FOREIGN PATENT DOCUMENTS

| | | | |
|---|---|---|---|
| JP | 2005280215 | A | 10/2005 |
| WO | WO-2014110663 | A1 | 7/2014 |

OTHER PUBLICATIONS

"International Application Serial No. PCT/CA2014/000025, International Search Report dated Apr. 11, 2014", 4 pgs.
"International Application Serial No. PCT/CA2014/000025, Written Opinion dated Apr. 11, 2014", 5 pgs.
Norboard, "[Video] Slected screen captures obtained Oct. 25, 2012, from YouTube video titled "How it's Made OSB"", [Online]. Retrieved from the Internet: <http://youtu.be/awxhgAMnyTs>, (Accessed Jan. 17, 2013), 9 pgs.

* cited by examiner

STRAND ORIENTATION SYSTEM AND METHOD

PRIORITY APPLICATIONS

This application is a U.S. National Stage Filing under 35 U.S.C. 371 from International Application PCT/CA2014/000025, filed on Jan. 17, 2014, and published as WO 2014/110663 on Jul. 24, 2014, and claims the benefit of priority to U.S. Provisional Application No. 61/754,418, filed Jan. 18, 2013, each of which is incorporated herein by reference in its entirety.

BACKGROUND

Composite wood products, such as oriented strand board (OSB), oriented strand lumber (OSL), or laminated strand lumber (LSL), among others, are formed using wood strands that are bonded together. FIG. 1 illustrates generally an example of a composite wood product comprised of rectangular wood strands. In some composite wood products, the strands are commonly aligned, such as in the direction indicated by the arrow 101. The wood strands used in some composite wood products are rectangular, and can be substantially uniform in length, width, and thickness. FIG. 2 illustrates generally an example of a wood strand 102 that has a particular length (L), width (W), and thickness (T).

The composite wood product forming process generally involves stranding or flaking a log into wood strands of a particular size or shape, treating the wood strands (e.g., drying the strands or mixing the strands with an adhesive or resin), aligning or otherwise distributing the wood strands to form a layered mat of strands, and pressing the mat under heat and pressure, in the presence of moisture, for a particular period of time.

Many variables contribute to differences among composite, strand-based wood products. Some variables include the type of wood used for the strands, the size or shape of the strands, the uniformity or density of the composite products, or the bonding process used to form the composite products.

Some composite, strand-based wood products are defined by ASTM International standards. For example, under ASTM D5456-11a, LSL is comprised of wood strands having a least dimension of 0.10 inches (2.54 mm) or less, and an average length that is a minimum of 150 times that least dimension. Under ASTM D5456-11a, OSL is comprised of wood strands having a least dimension of 0.10 inches (2.54 mm) or less, and an average length that is a minimum of 75 times that least dimension. In other words, LSL is generally comprised of strands having a length-to-thickness ratio of about 150:1, and OSL is generally comprised of strands having a length-to-thickness ratio of about 75:1. LSL and OSL can be used for applications such as studs or millwork components, among others.

The properties of a formed, strand-based wood product can depend on the above-mentioned variables, among others. For example, a formed product's modulus of elasticity (a measure of material stiffness or rigidity) or modulus of rupture (a measure of bending a material can withstand without breaking) can be a function of strand length and stand alignment, among other variables. In some products, a higher modulus of elasticity can correspond to longer strands that are better aligned than in a product using similar length strands that are more poorly or irregularly aligned.

Various systems can be used to orient wood strands. These systems are generally optimized to align strands in a common direction, to uniformly distribute strands across a mat area of the system, and to operate at an economical throughput.

Some orienter systems use rotating disks, mounted on multiple shafts, disposed under a supply of wood strands. Strands fall from the supply onto the disks while the disks are rotating, and the strands become aligned as they descend between the disks. The aligned strands form a mat below the disks, such as on a moving conveyor. Barnes, in U.S. Pat. No. 5,487,460, entitled "Short Strand Orienter," describes an orienter with multiple decks of rotating disks, and the multiple decks have different inter-disk spacings. For example, an inter-disk spacing on an upper deck of disks can be wider than an inter-disk spacing on a lower deck of disks. Similarly, Knudson, in U.S. Pat. No. 6,752,256, entitled "System for Improving Wood Strand Orientation in a Wood Strand Orienter using Rotating Orienting Fingers," describes an orienter with "pre-orienting" shafts positioned above orienter discs.

Other orienter systems use vanes, or parallel plates, disposed under a supply of wood strands. Strands fall from the supply onto the plates and become aligned as they descend between the plates. Etzold, in U.S. Pat. No. 4,058,201, entitled "Method and Apparatus for Orienting Wood Strands into Parallelism," describes adjacent plates that reciprocate in opposite directions relative to each other to encourage strands into a common orientation.

Barnes et al., in U.S. Pat. No. 5,676,236, entitled "Vane Orienter with Wipers," describes partition walls that define passages, and wipers disposed in the passages to wipe strands that may otherwise plug the orienter.

OVERVIEW

The present inventors have recognized, among other things, that a problem to be solved can include improving orienter system throughput in the alignment of short strands while maintaining or improving strand alignment and producing a mat having substantially uniform density. The present subject matter can provide a solution to this problem, such as by using an apparatus having multiple rotating discs, or agitation members, and a stationary vane set. The multiple agitation members can be axially-spaced along multiple rotatable shafts, and the shafts can be disposed above or coincident with a top edge of the stationary vane set. The vane set can have multiple partitions, and spacing between adjacent partitions can be greater on a lower, mat-side of the vane set than on an upper, rotatable shaft-side of the vane set. In an example, the apparatus can be used to produce either OSB or OSL, such as without modification of any feature of the apparatus.

The present inventors have recognized, among other things, that a problem to be solved can include manufacturing an engineered wood product having properties similar to LSL using shorter wood strands than are typically used for LSL products. The present subject matter can help provide a solution to this problem, such as by achieving better alignment and more uniform distribution of shorter strands (e.g., corresponding to more uniform density) than can be achieved by other means. The present subject matter can include a system for orienting strands (e.g., wood strands), including multiple rotatable shafts that extend perpendicular to a travel direction of a mat of aligned strands. Each shaft can include axially spaced agitation members that extend radially away from the shaft, such as in a direction parallel to the travel direction. A vane set can be positioned vertically below the shafts or below a portion of the agitation members. The vane set can include multiple partitions that define inter-partition spacings that are substantially parallel to the travel direction. In an example, an inter-partition spacing of the vane set can be greater along a bottom portion of adjacent partitions than along a top portion of the same adjacent partitions. In an example, an upper edge thickness of a partition can be greater than a lower edge thickness of the same partition.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
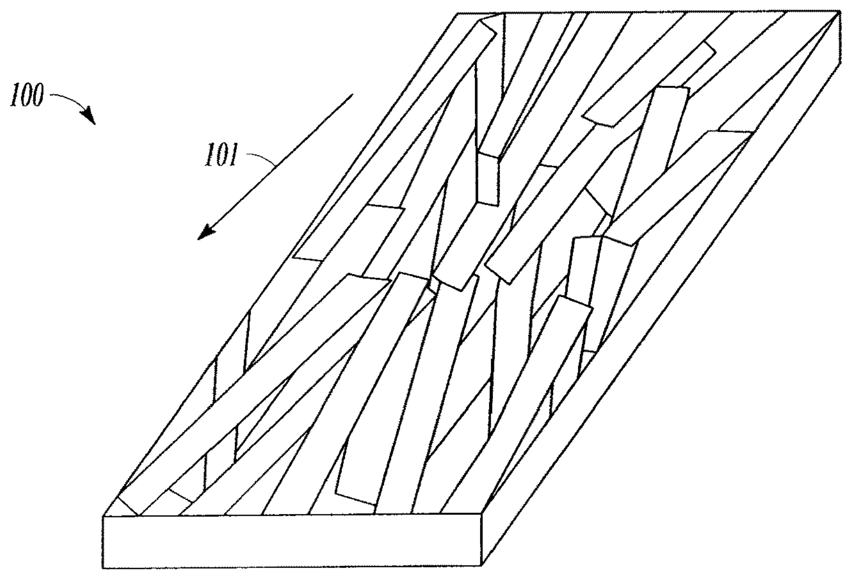
FIG. 1 illustrates generally a perspective view of an example of a composite product.
Figure 2:
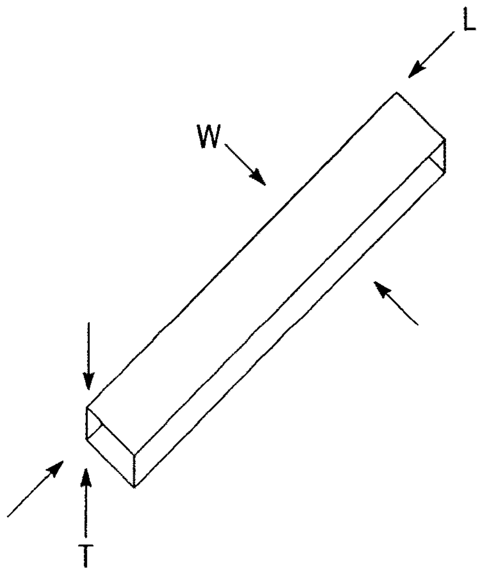
FIG. 2 illustrates generally a perspective view of an example of a strand.
Figure 3:
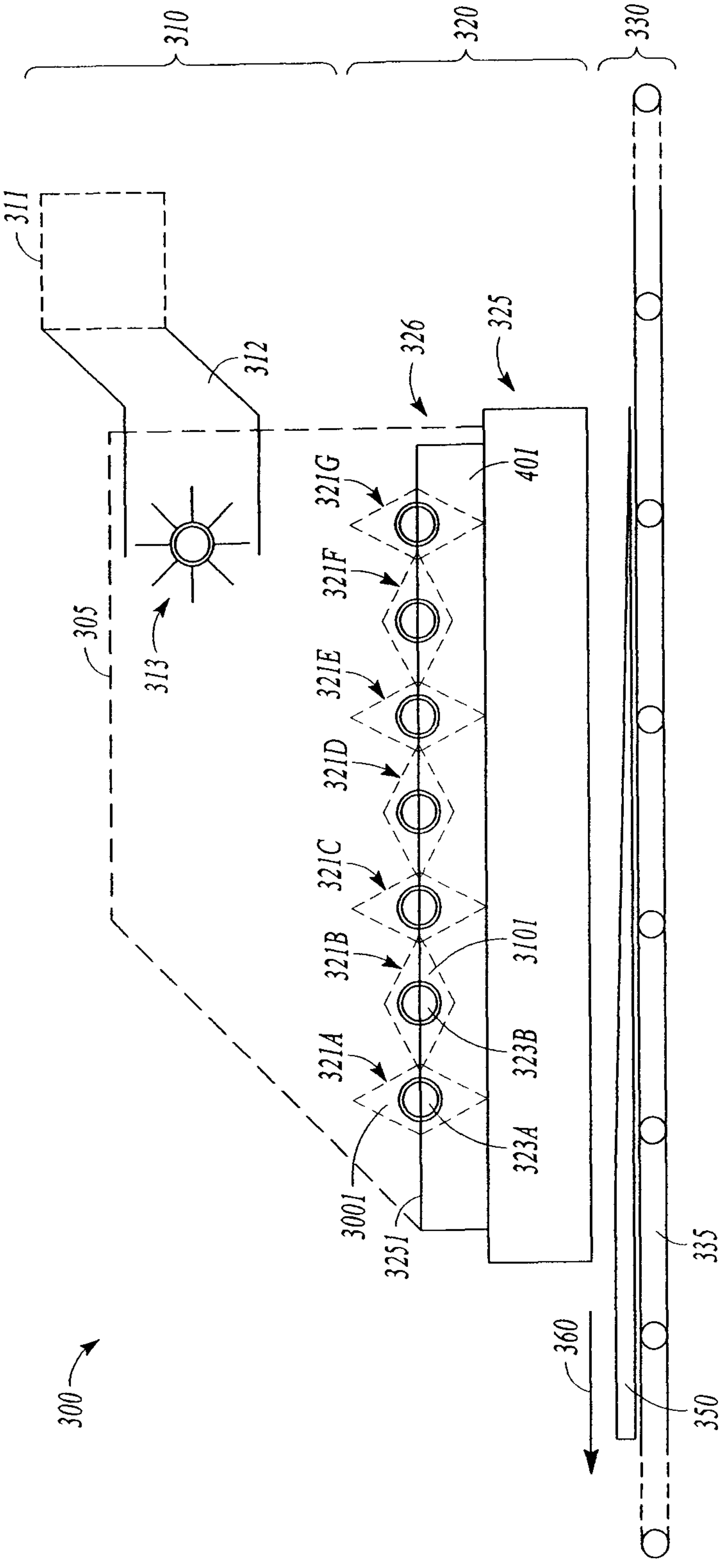
FIG. 3 illustrates generally a side view of an example of a strand orienter system.

FIG. 3 illustrates generally a side view of an example of a strand orienter system 300. The orienter system 300 can include an infeed portion 310, an aligner portion 320, and a strand receiving portion 330. A supply of unaligned wood strands (e.g., dried and/or resinated wood strands) can be introduced to the aligner portion 320 via the infeed portion 310. The strands can be substantially aligned in the aligner portion 320, and can be used to form a mat in the strand receiving portion 330. In an example, the aligner portion 320 is disposed substantially vertically below the infeed portion 310, and the receiving portion 330 is disposed substantially vertically below the aligner portion 320.

In an example, the infeed portion 310 can include a metering bin 311. The metering bin 311 can hold bulk, unaligned wood strands, and the metering bin 311 can be configured to supply unaligned wood strands to the downstream aligner portion 320. The infeed portion 310 can include a chute 312, coupled to the metering bin 311, configured to direct unaligned strands toward a distribution roll 313. The distribution roll 313 can be configured to receive unaligned strands via the chute 312, and uniformly meter and distribute the unaligned strands into the aligner portion 320. The distribution roll 313 can include a shaft with multiple, radially-extending members disposed substantially along the length of the shaft of the distribution roll 313. The distribution roll 313 can be operated at various rates, such as to achieve various degrees of dispersion of wood strands across a width and length of the infeed portion 310 and the aligner portion 320. In some examples, multiple distribution rolls 313 can be used.

In an example, the aligner portion 320 can include an agitation member portion 326 and a vane set 325. The agitation member portion 326 can be configured to agitate or distribute strands received from the infeed portion 310. The vane set 325 can be configured to align the strands and guide the strands down toward the mat. The agitation member portion 326 can include multiple agitation roll assemblies 321A, 321B, . . . 321G. Although the example of FIG. 3 illustrates seven agitation roll assemblies, fewer or additional roll assemblies can be used depending on, among other things, the scale of the orienter system 300, the size of the wood strands 102 to be aligned, or the required system throughput, among other factors.

Figure 5A:
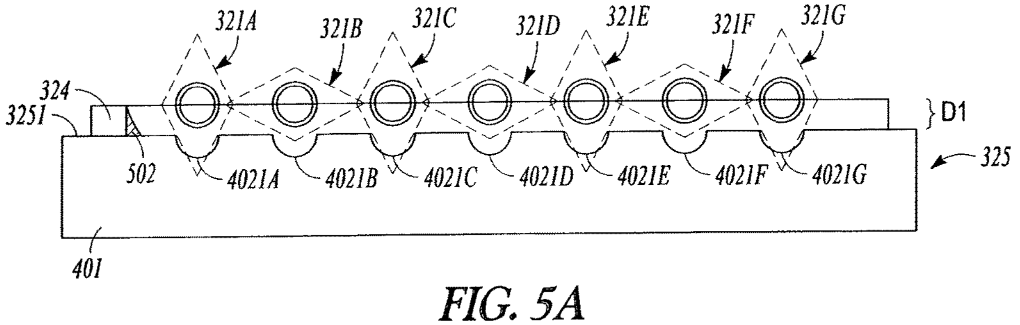
FIGS. 5A and 5B illustrate generally side views of agitation roll assemblies.
Figure 5B:
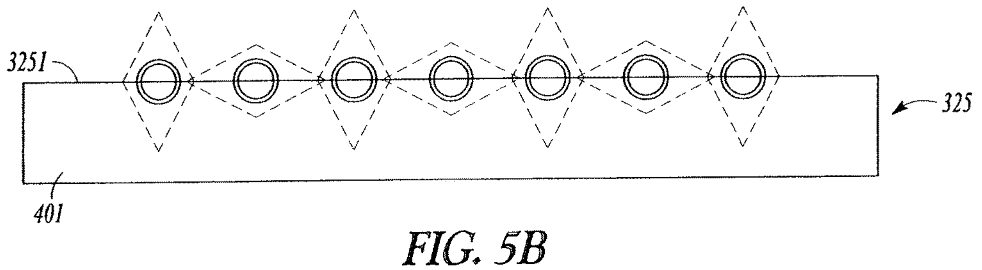

The multiple agitation roll assemblies 321A, 321B, . . . 321G, can have respective rotatable shafts 323A, 323B, . . . 323G, that can be oriented parallel to one another. Each of the rotatable shafts 323A, 323B, . . . 323G, can be spaced apart in a plane (e.g., in a plane perpendicular to the page in the side view of FIG. 3). A height of the rotatable shafts above the vane set 325 can be adjusted using a shaft coupling table 324 (shown in FIG. 5A). FIGS. 5A and 5B illustrate generally such shaft height adjustability. In an example, the multiple agitation roll assemblies 321A, 321B, . . . 321G, can be rotated clockwise and/or counter-clockwise using their respective rotatable shafts 323A, 323B, . . . 323G.

An agitation roll assembly (e.g., any of the agitation roll assemblies 321A, 321B, . . . 321G) can include axially-spaced agitation members disposed along a portion of a length of the assembly. The agitation members can extend radially away from the shafts of their respective agitation roll assemblies. In an example, the first agitation roll assembly 321A can include at least a first agitation member 3001 axially spaced along the shaft 323A from a second agitation member (not shown in FIG. 3). For example, in the side view of FIG. 3, the second agitation member can be disposed behind the first agitation member 3001. In an example, agitation members of a particular agitation roll assembly are affixed to a common rotatable shaft such that all the agitation members rotate at the same angular velocity as the shaft.

In an example, an axial spacing between adjacent agitation members of an agitation roll assembly (e.g., between the first agitation member 3001 and the second agitation member of the first agitation roll assembly 321A) can be greater than a width W of the strand 102. In an example, a spacing between adjacent ones of the parallel rotatable shafts 323A, 323B, etc. can be greater than a length L of the strand 102.

Referring now to the vane set 325, the vane set 325 can include multiple spaced apart, parallel, and substantially vertical partitions. The partitions can define inter-partition chutes, or spaced openings, that can be configured to be wider than a width W of a strand to be processed by the vane set 325. In an example, the partitions can extend substantially along a length of the orienter system 300. For example, a first partition 325A is a substantially flat partition plate that extends along a length of the orienter system 300. Other views of the multiple partitions and chutes are presented in subsequent figures, such as in FIGS. 4 and 8.

Referring now to a portion of the orienter system 300 where the agitation member portion 326 meets the vane set 325, at least a portion of the agitation member portion 326 can be disposed substantially vertically above the vane set 325. In an example, one or more agitation members in the agitation member portion 326 can be substantially aligned with at least one inter-partition chute of the vane set. In an example, at least a portion of an agitation member can intermittently or continuously extend into an inter-partition chute, such as during operation of the orienter system 300.

Referring now to the receiving portion 330 of the orienter system 300, the receiving portion 330 can include a mat 350 of substantially aligned strands. The mat 350 can be formed atop a moving conveyor 335. In an example, a travel direction of the conveyor 335 and mat 350 is indicated by the arrow 360. In an example, the travel direction indicates a machine direction of the orienter system 300. That is, the machine direction illustrates generally a flow of the strands from the metering bin 311, through the aligner portion 320, to the mat 350, and toward other downstream processes (e.g., heating and/or pressing to form a composite product).

Figure 4:
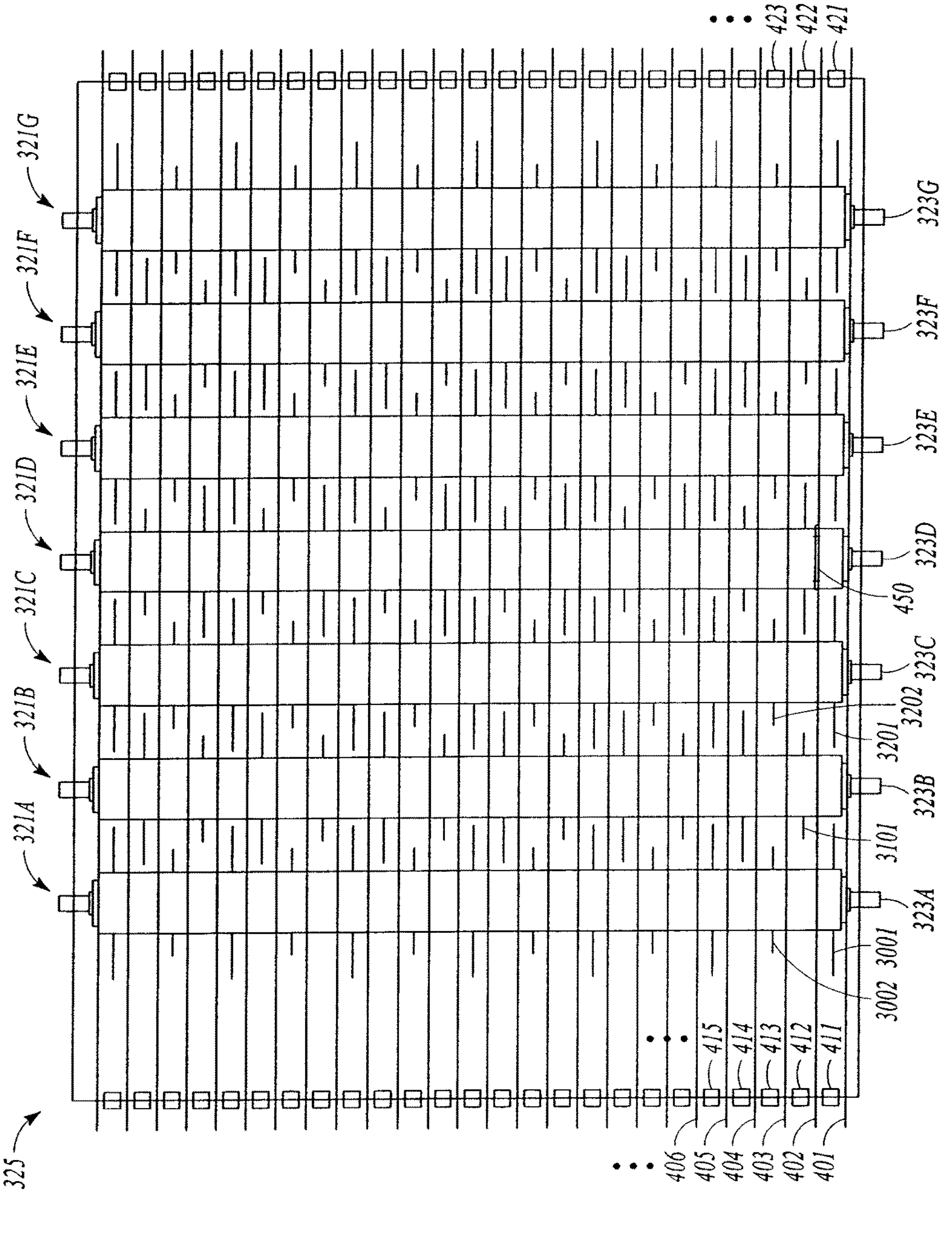
FIG. 4 illustrates generally a top view of an example of an aligner portion of an orienter system.

FIG. 4 illustrates generally a top view of an example of the aligner portion 320 of the orienter system 300. The aligner portion 320 includes the vane set 325 and the multiple agitation roll assemblies 321A, 321B, . . . 321G. The vane set 325 includes partitions 401, 402, 403, etc. The partitions can be disposed substantially perpendicular to the shafts 323A, 323B, . . . 323G, of the agitation roll assemblies.

A spacer element can be disposed between adjacent partitions, such as to provide or maintain a specified distance between adjacent partitions. For example, a first spacer 411 can be disposed between the first partition 401 and the adjacent second partition 402, a second spacer 412 can be disposed between the second partition 402 and the adjacent third partition 403, and so on. Spacer elements can be disposed at one or more locations along the vane set 325. In the example of FIG. 4, a first set of spacer elements (e.g., the spacer elements 411, 412, 413, 414, 415, etc.) is disposed at a first side of the vane set 325 along a mat-exit side of the orienter system 300, and a second set of spacer elements (e.g., including the spacer elements 421, 422, 423, etc.) is disposed at an opposite second side of the vane set 325. Additional spacer elements can be disposed at other locations along the vane set 325 as needed to maintain adequate spacing between adjacent partitions.

As shown in the example of FIG. 4, agitation members of the agitation roll assemblies can be aligned with the inter-partition chutes of the vane set 325. For example, the first agitation member 3001 of the first agitation roll assembly 321A can be aligned with an inter-partition chute between the first and second partitions 401 and 402. In an example, the first agitation member 3001 can be disposed at least partially within the chute between the first and second partitions 401 and 402. In an example, the first agitation member 3101 of the second agitation roll assembly 321B can be aligned with an inter-partition chute between the second and third partitions 402 and 403, the first agitation member 3201 of the third agitation roll assembly 321C can be aligned with an inter-partition chute between the first and second partitions 401 and 402, and so on.

In an example, the multiple agitation members corresponding to a particular one of the agitation roll assemblies can be aligned with and/or disposed in different chutes in the vane set 325. For example, with respect to the first agitation roll assembly 321A, the first agitation member 3001 can be disposed between the first and second partitions 401 and 402, a second agitation member 3002 can be disposed between third and fourth partitions 403 and 404, a third agitation member 3003 can be disposed between fifth and sixth partitions 405 and 406, and so on. In this manner, adjacent agitation members of a particular agitation roll assembly can correspond to about every other chute along the length of the assembly's shaft.

In an example, at least one of the agitation roll assemblies can include an alignment feature configured to align one or more agitation roll assemblies with the vane set 325. In the example of FIG. 4, the fourth agitation roll assembly 321D includes an alignment feature 450. In an example, the alignment feature 450 can be a notch around the circumference of the shaft 323D, and can be configured to receive a portion of a partition of the vane set 325. For example, the partition 402 can include a mating alignment feature that corresponds to the alignment feature 450. The partition feature can encourage the fourth agitation roll assembly 321D into a position such that the agitation members of the fourth agitation roll assembly 321D correspond with chutes in the vane set.

FIGS. 5A and 5B illustrate generally side views of examples of agitation roll assemblies positioned at different heights above the vane set 325. In the examples of FIGS. 5A and 5B, a side view of the first partition 401 is provided. In an example, the shaft coupling table 324 can be used to adjust a distance of one or more agitation roll assemblies from an upper edge 3251 of the vane set 325. In some examples, the vane set includes partitions of varying heights. One or more agitation roll assemblies can be mounted to the coupling table 324, or multiple coupling tables can be used (e.g., each agitation roll assembly can be independently adjustable using a different coupling table).

In the example of FIG. 5A, the multiple agitation roll assemblies 321A, 321B, . . . 321G, are mounted to a common coupling table 324. In this example, each of the agitation roll assemblies is positioned a similar distance D1 from the upper edge 3251 of the vane set 325, as measured from a center of a shaft of the roll assemblies. In this example, there can be a vertical spacing or gap between a lower extent of one or more portions of an agitation member and the upper edge 3251 of the vane set 325. Because of the gap, strands may not be fully guided into the chutes, and some strands may fall across the top edges of multiple partitions. Strands that come to rest atop the partitions can cause portions of the orienter to clog.

In the example of FIG. 5A, at least a portion of the agitation members of the agitation roll assemblies 321A, 321B, . . . 321G, extend below the upper edge 3251 of the vane set 325 and into the chutes of the vane set 325. Strands may come to rest in the zone 502, which can clog this portion of the orienter. In some examples, strands that are partially disposed in the zone 502 can be broken by the agitation members.

In the example of FIG. 5B, a center of a shaft of the roll assemblies is aligned with the upper edge 3251 of the vane set 325 such that, for symmetrical agitation members, half of any one of the agitation members is disposed in a vane chute at any given time. In an example, the partitions can include cutouts along the upper edge 3251 configured to receive a roll assembly shaft. As shown in the example of FIGS. 5A and 5B, the first partition 401 can include cutouts 4021A, 4021B, . . . 4021G, such as corresponding to the size and shape of the shafts of the agitation roll assemblies 321A, 321B, . . . 321G. In some examples, the agitation roll assemblies 321A, 321B, . . . 321G, can be disposed further vertically below the upper edge 3251 of the vane set 325.

Other configurations can be used as well. For example, two or more of the agitation roll assemblies can be disposed at different heights above the upper edge 3251 of the vane set 325. In an example, the agitation roll assemblies can be disposed along a common slope, such as corresponding to or opposing the machine direction of the orienter system 300. That is, an agitation roll assembly disposed near the rear of the orienter system 300 (e.g., near the metering bin 311) can be disposed a first height above the vane set 325, and an agitation roll assembly disposed near the front of the orienter system 300 can be disposed a second greater or lesser height above the vane set 325. Alternatively, or additionally, one or more of the partitions of the vane set 325 can have different vertical heights.

In an example, the distance from a bottom edge of the vane set 325 to a receiving surface of the moving conveyor 335 can be adjustable. This distance can be a critical variable in improving the alignment of strands processed by the orienter system 300. Two or more partitions of the vane set 325 can have bottom edges that are differently spaced from the receiving surface of the moving conveyor 335. In some examples, one or more partitions of the vane set 325 can have bottom edges that are sloped along the machine direction of the orienter system 300. For example, a slope of the one or more partitions of the vane set 325 can correspond to increasing mat height below the vane set 325.

Figures 6A, 6B, 6C:
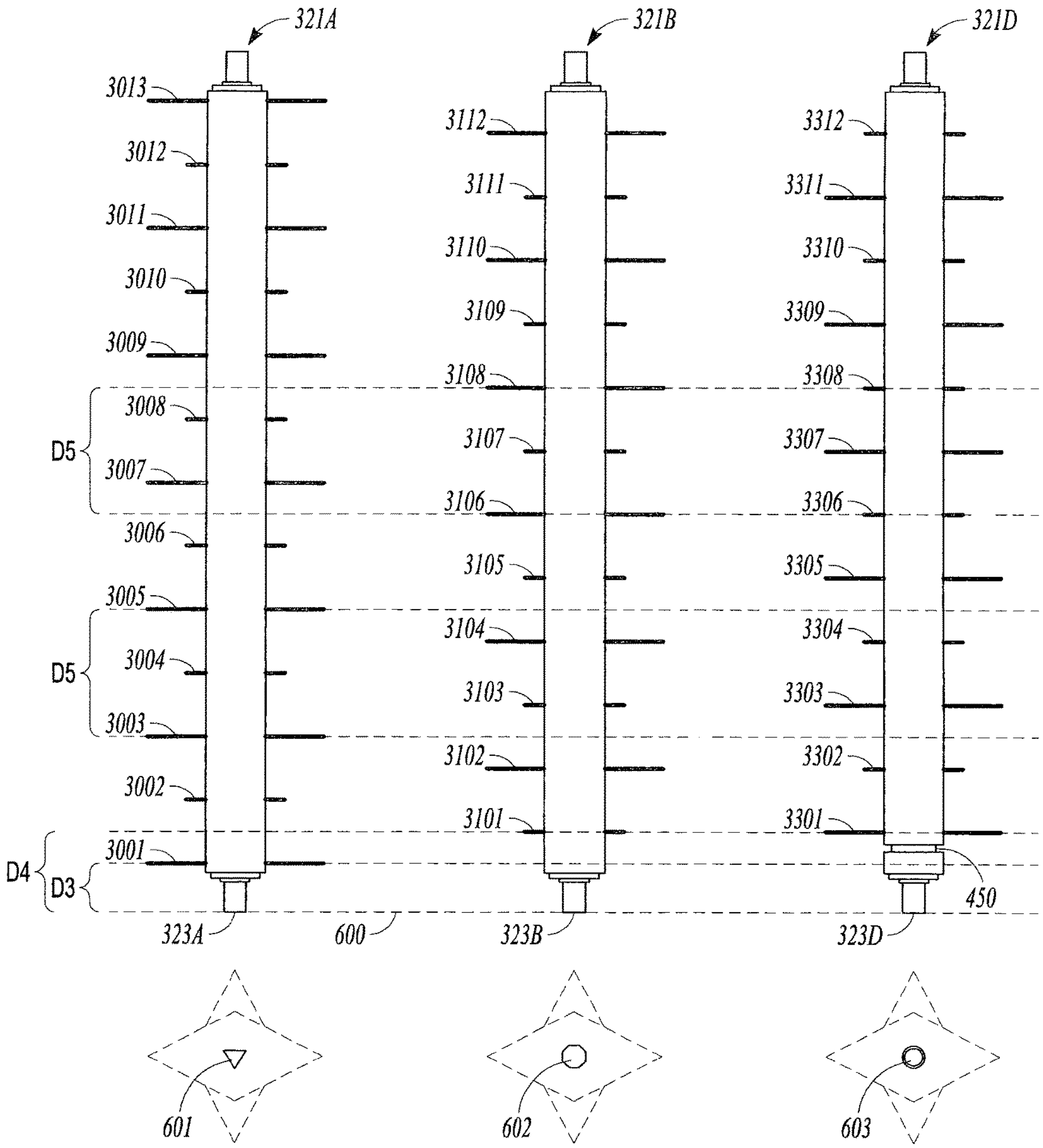
FIGS. 6A-6C illustrate generally top and side views of examples of agitation roll assemblies.

FIGS. 6A-6C illustrate generally top and side views of examples of agitation roll assemblies. FIG. 6A, upper, illustrates generally a top view of an example of axial spacing of agitation members 3001, 3002, . . . 3013, along the agitation roll assembly 321A. FIG. 6A, lower, illustrates generally a side view of an example of the agitation members 3001, 3002, . . . 3013 on the agitation roll assembly 321A. In the example of FIG. 6A, the shaft 601 of the agitation roll assembly 321A can have a triangular cross section.

FIG. 6B, upper, illustrates generally a top view of an example of axial spacing of agitation members 3101, 3102, . . . 3112, along the agitation roll assembly 321B. In the example of FIG. 6B, the shaft 602 of the agitation roll assembly 321B can have a hexagonal cross section. FIG. 6C, upper, illustrates generally a top view of an example of axial spacing of agitation members 3301, 3302, . . . 3312, along the agitation roll assembly 321D. FIG. 6C further illustrates the alignment feature 450 of the agitation roll assembly 321D. In the example of FIG. 6C, the shaft 603 of the agitation roll assembly 321D can have a substantially circular cross section. Other shaft shapes can be used.

FIGS. 6A-6C illustrate generally agitation member spacing and agitation roll assembly spacing. (See also FIGS. 3 and 4.) In an example, a spacing between adjacent agitation roll assemblies can be selected depending on, among other factors, strand size (e.g., strand length) and agitation member shape or size. In an example, agitation members can be selected that have non-uniform radial extents. That is, non-circular agitation members can be used. In the examples of FIGS. 3-6, diamond-shaped agitation members are shown.

FIGS. 3, 4, and 6A-6C illustrate generally that adjacent agitation members on a particular agitation roll assembly can be offset. In FIG. 6A, for example, the first agitation member 3001 can correspond to a diamond shaped agitation member having its long axis along a first direction (e.g., horizontal, or parallel to a travel direction of an orienter system). The second agitation member 3002 can correspond to a diamond shaped agitation member having its long axis along a second direction that is different than the first direction (e.g., vertical, or perpendicular to the travel direction of the orienter system). The third agitation member 3003 can correspond to a diamond shaped agitation member having its long axis along a third direction, such as along the same direction as the first direction, or a different direction than both the first and second directions. In this manner, agitation member orientation can be staggered or offset between adjacent agitation members on common agitation roll assemblies. Agitation member orientation can also be staggered between nearby agitation members on adjacent agitation roll assemblies. By staggering the agitation member orientation, strands can be further encouraged to pass between the agitation members as the members rotate, and strands can be less likely to get caught between adjacent agitation members or broken by the agitation members.

In an example, each pair of commonly-aligned agitation members along a particular agitation roll assembly can be spaced apart approximately equally. For example, the spacing between the first and third agitation members 3001 and 3003 of the first agitation roll assembly 321A can be about the same as the spacing between the third and fifth agitation members 3003 and 3005 (distance D5), which can be about the same as the spacing between the fifth and seventh agitation members 3005 and 3007, and so on. In an example, commonly-aligned agitation members along other agitation roll assemblies can be similarly spaced. For example, the spacing between the second and fourth agitation members 3102 and 3104 of the second agitation roll assembly 321B can be about the same as the spacing between the sixth and eighth agitation members 3106 and 3108 (distance D6). In some examples, commonly-aligned agitation members of different agitation roll assemblies can be similarly spaced. For example, the distances D5 and D6 can be about the same.

In the example of FIG. 6A, the first agitation member 3001 of the first agitation roll assembly 321A can be disposed a distance D3 from an origin of the first rotatable shaft 323A. In the example of FIG. 6B, the first agitation member 3101 of the second agitation roll assembly 321B can be disposed a distance D4 from an origin of the second rotatable shaft 323B that corresponds to the origin of the first rotatable shaft 323A. In the example of FIG. 6C, the first agitation member 3301 of the fourth agitation roll assembly 321D can be disposed a distance D4 from a similar corresponding origin. The difference between distances D3 and D4 permits an offset between nearby agitation members of adjacent agitation roll assemblies. For example, referring again to FIGS. 4 and 6A-6C, the agitation member 3001 of agitation roll assembly 321A is offset from the agitation member 3101 of adjacent agitation roll assembly 321B. The agitation member 3101 of agitation roll assembly 321B is offset from the agitation members 3002 of agitation roll assembly 321A, and from agitation members 3201 and 3202 of agitation roll assembly 321C.

Figure 7A:
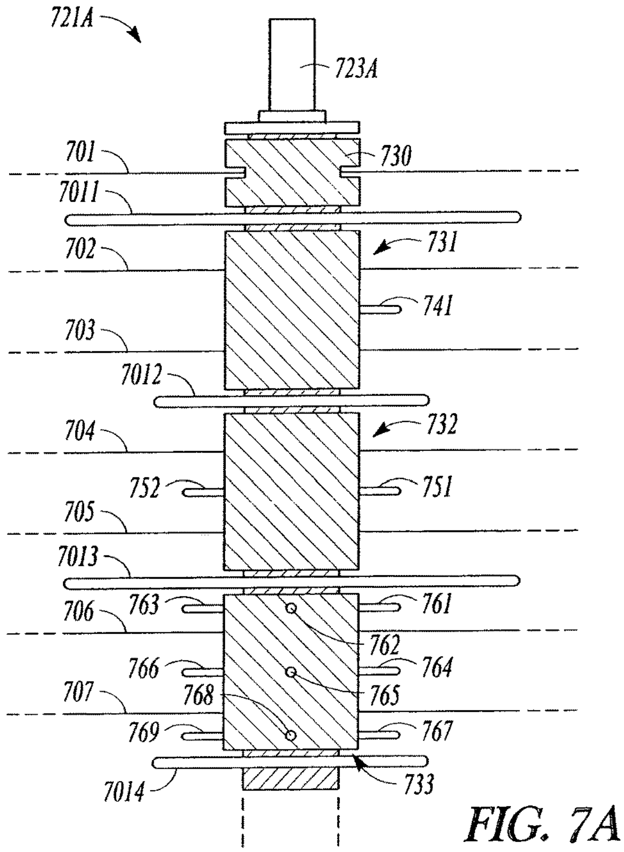
FIG. 7A illustrates generally a top view of an example of a portion of an agitation roll assembly.
Figure 7B:
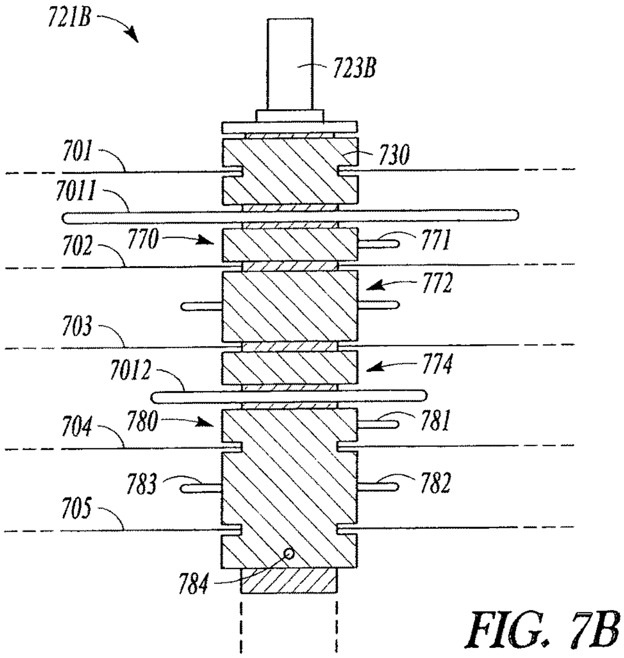
FIG. 7B illustrates generally a top view of an example of a portion of an agitation roll assembly.
Figure 7C:
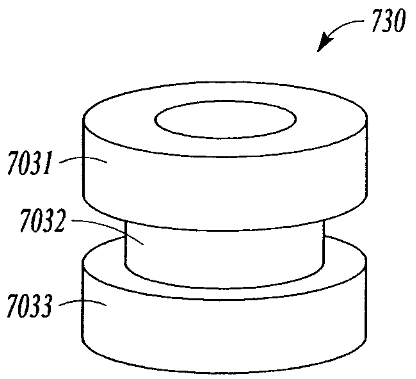
FIG. 7C illustrates generally a perspective view of an example of a roll assembly-end vane spacer.
Figure 7D:
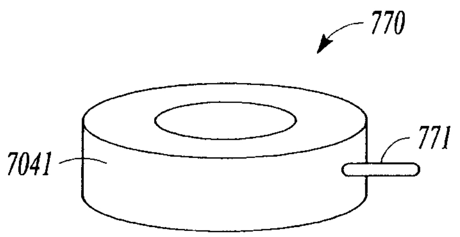
FIG. 7D illustrates generally a perspective view of an example of a picker style spacer.
Figure 7E:
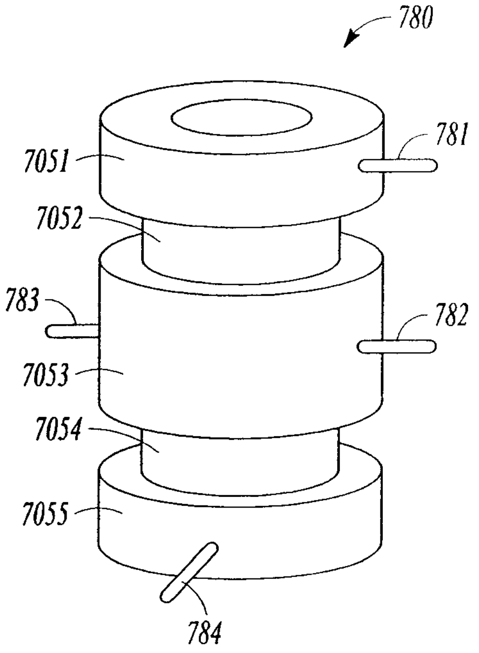
FIG. 7E illustrates generally a perspective view of an example of a picker and vane style spacer.

Various agitation member spacers and vane spacers can be disposed along a shaft of an agitation roll assembly. FIGS. 7A and 7B illustrate generally top views of examples of a portion of an agitation roll assembly. FIG. 7C illustrates generally a perspective view of an example of a roll assembly-end vane spacer. FIG. 7D illustrates generally a perspective view of an example of a picker style spacer. FIG. 7E illustrates generally a perspective view of an example of a picker and vane style spacer. In an example, one or more spacers can be used to maintain a spacing or distance between one or more partitions and agitation members, such as relative to one another and/or relative to an end of a roll assembly shaft. In an example, one or more spacers can be configured to maintain an alignment of a vane partition, such as to maintain adjacent partitions in parallel.

The example of FIG. 7A shows a portion of an agitation roll assembly 721A, including a shaft 723A, a first agitation member 7011, a second agitation member 7012, a third agitation member 7013, and a fourth agitation member 7014. In this example, the first agitation member 7011 is disposed between first and second partitions 701 and 702 (e.g., of the vane set 325), the second agitation member 7012 is disposed between third and fourth partitions 703 and 704, and so on.

The example of FIG. 7A illustrates a roll assembly-end vane spacer 730, and several agitation member spacers, including a first agitation member spacer 731, a second agitation member spacer 732, and a third agitation member spacer 733. The roll assembly-end vane spacer 730 is disposed between the first agitation member 7011 and the first partition 701. The roll assembly-end vane spacer 730 maintains a distance between the first agitation member 7011 and the first partition 701. In an example, the roll assembly-end vane spacer 730 is made of a plastic or other rigid material. The material can have a sufficiently low coefficient of friction such that rotation of the spacer and/or an agitation member or partition is not significantly restricted when the spacer is disposed against one or both of an agitation member and a partition. In some examples, the roll assembly-end vane spacer 730 can be fixedly coupled to one or more of the shaft 723A, the first partition 701, or the first agitation member 7011. One or more washers or other interposing members can be disposed between the roll assembly-end vane spacer 730 and the first partition 701 or the first agitation member 7011, such as to reduce friction or adjust spacing. In an example, the first, second, and third agitation member spacers 731, 732, and 733, are disposed in or against corresponding cutouts in the several partitions 702, 703, 704, 705, 706, and 707, configured to receive the spacers.

FIG. 7C illustrates generally a perspective view of the roll assembly-end vane spacer 730. As shown, the roll assembly-end vane spacer 730 includes a first spacer portion 7031, a second spacer portion 7032, and a third spacer portion 7033. The first and third spacer portions 7031 and 7033 can be substantially similar, such as having substantially the same outer diameter, and defining a groove therebetween, wherein the depth of the groove is determined by the outer diameter of the second spacer portion 7032, and the outer diameter of the second spacer portion 7032 is less than the outer diameters of each of the first and third spacer portions 7031 and 7033. In this manner, the roll assembly-end vane spacer 730 can be aligned with the first partition 701 using the groove. The roll assembly-end vane spacer 730 can have a through-hole along its axis having an inner diameter that is slightly larger than an outer diameter of the shaft 723A such that the spacer can be disposed on the shaft 723A. A set screw or other feature can be used to secure the spacer to the shaft.

In an example, the roll assembly-end vane spacer 730 can be used to maintain alignment of the agitation roll assembly 721A while improving the rigidity and stability of the first partition 701. In an example, the roll assembly-end vane spacer 730 can be configured to matingly engage with a partition cutout, such as the cutout 4021A in the example of FIG. 5A. Other spacers can be used to further improve the spacing and stability of other partitions in the vane set 325, such as further described below in the examples of FIGS. 7B, 7D, and 7E.

Referring again to FIG. 7A, the first agitation member spacer 731 is disposed between the first and second agitation members 7011 and 7012, the second agitation member spacer 732 is disposed between the second and third agitation members 7012 and 7013, and so on. The agitation member spacers can be placed on, around, or can be coupled or otherwise affixed to the shaft 723A. For example, the first agitation member spacer 731 can be substantially cylindrical. The first agitation member spacer 731 can have a through-hole along its axis having an inner diameter that is slightly larger than an outer diameter of the shaft 723A such that the first agitation member spacer 731 can be disposed on the shaft 723A. A set screw or other feature can be used to secure an agitation member spacer to an agitation roll assembly shaft.

In an example, an agitation member spacer or a roll assembly-end vane spacer can include one or more picks. A pick can be an agitation feature that protrudes from or extends away from the spacer. In an example, the first agitation member spacer 731 can include a pick 741. When the orienter system 300 is in use, the pick 741 can prevent strands from nesting between agitation members on the agitation member spacers. In some examples, the length of the pick 741 can be approximately the same as the shortest distance between an agitation member edge and the agitation roll assembly shaft. A pick can be made from a rigid material (e.g., metal, wood, etc.) or from a flexible material (e.g., rubber, silicone, etc.).

In an example, an agitation member spacer can include multiple picks, such as shown in the examples of the second agitation member spacer 732 and the third agitation member spacer 733. The second agitation member spacer 732 includes two picks 751 and 752 that extend away from the second agitation member spacer 732, such as in opposite directions. The third agitation member spacer 733 includes several sets of picks (e.g., picks 761, 762, and 763 disposed between the sixth partition 706 and the third agitation member 7013; picks 764, 765, and 766 disposed between the sixth and seventh partitions 706 and 707; and picks 767, 768, and 769 disposed between the seventh partition 707 and the fourth agitation member 7014). The sets of picks can be variously distributed about the third agitation member spacer 733, such as 120 degrees apart. More or fewer picks can be used.

The example of FIG. 7B shows a portion of an agitation roll assembly 721B, including a shaft 723B, the first agitation member 7011, and the second agitation member 7012. In this example, the first agitation member 7011 is disposed between the first and second partitions 701 and 702 (e.g., of the vane set 325), and the second agitation member 7012 is disposed between third and fourth partitions 703 and 704, as described above in the discussion of FIG. 7A.

The example of FIG. 7B illustrates several multi-purpose agitation member and vane spacers that optionally include one or more picks. For example, FIG. 7B includes a first half-width picker spacer 770, a first full-width picker spacer 772, a second half-width picker spacer 774, and a multi-spacer 780. The multi-purpose agitation member and vane spacers can be comprised of a plastic or other rigid material, such as having a sufficiently low coefficient of friction when placed against one or more of an agitation member, a partition, or another spacer (see, e.g., the discussion of friction of the roll assembly-end vane spacer 730, above). In some examples, multi-purpose agitation member and vane spacers can be fixedly coupled to one or more of the shaft 723B, a partition, or an agitation member. One or more washers or other interposing members can be disposed between a spacer and an adjacent spacer, agitation member, or partition.

In an example, a half-width picker spacer can be disposed on an agitation roll shaft adjacent an agitation member, such as between the agitation member and an adjacent vane partition. In the example of FIG. 7B, the first half-width picker spacer 770 is disposed on the shaft 723B between the first agitation member 7011 and the second partition 702, and is configured to maintain a particular distance between the agitation member and the partition.

FIG. 7D illustrates generally a perspective view of the first half-width picker spacer 770. As shown, the first half-width picker spacer 770 includes a spacer ring 7041, such as having an inner diameter that corresponds to the shaft 723B, and an outer diameter that is less greater than the diameter of the shaft 723B but less than a diameter of an agitation member. In an example, a set screw or other feature can be used to secure the spacer to the shaft. In an example, the first half-width picker spacer 770 can include one or more picks 771.

In an example, the first half-width picker spacer 770 can be used to maintain alignment of the agitation roll assembly 721B while improving or maintaining the rigidity and stability of the second partition 702. For example, as shown in FIG. 7B, alignment of the second partition 702 can be determined or reinforced by at least the roll assembly-end spacer 730, the first partition 701, the first agitation member 7011, and the first half-width picker spacer 770. Other spacers can be used to further improve the rigidity and stability of other partitions in the vane set 325. For example, the first full-width picker spacer 772 can be disposed adjacent the first half-width picker spacer 770, such as on the opposite side of the second partition 702 from the first half-width picker spacer 770. Thus, the second partition can be supported by both the first half-width picker spacer 770 and the first full-width picker spacer 772. In an example, the second half-width picker spacer 774 can be disposed adjacent the first full-width picker spacer 772, such as on the opposite side of the third partition 703. In an example, the first and second half-width picker spacers 770 and 774 can be substantially similar, and one or more picks coupled to the spacers can be differently or similarly aligned. As shown in the example of FIG. 7B, a pick on the first half-width picker spacer 770 is configured to extend in a first direction, and a pick on the second half-width picker spacer 774 is configured to extend in a second direction that is orthogonal to the first direction. The second half-width picker spacer 774 can maintain an alignment of the third partition 703 and the second agitation member 7012. Other full-width and half-width picker spacers can be used along the length of the shaft 723 to maintain inter-partition and inter-agitation member spacings, and to maintain the parallel arrangement of the partitions.

FIG. 7E illustrates generally a perspective view of the multi-spacer 780. The multi-spacer 780 is configured to straddle multiple partitions. In an example, the multi-spacer 780 can be used to maintain alignment of the agitation roll assembly 721B while improving the rigidity and stability of the multiple partitions that the spacer straddles, as well as spacing apart adjacent agitation members.

As shown, the multi-spacer 780 includes a first spacer portion 7051, a second spacer portion 7052, a third spacer portion 7053, a fourth spacer portion 7054, and a fifth spacer portion 7055. The first, third, and fifth spacer portions 7051, 7053, and 7055 can be substantially similar, such as having substantially the same outer diameter, and defining grooves between the first and third spacer portions 7051 and 7053, and between the third and fifth spacer portions 7053 and 7055. The depth of the grooves is determined by the outer diameter of the interposing second and fourth spacer portions 7052 and 7054, respectively. In this manner, multi-spacer 780 can be aligned with the fourth partition 704 using the groove corresponding to the second spacer portion 7052, and can be aligned with the fifth partition 705 using the groove corresponding to the fourth spacer portion 7054. The multi-spacer 780 can have a through-hole along its axis having an inner diameter that is slightly larger than an outer diameter of the shaft 723B such that the spacer can be disposed on the shaft 723B. A set screw or other feature can be used to secure the spacer to the shaft. In an example, the multi-spacer 780 can include one or more picks that can be configured to extend in various directions away from an axis of the spacer. The example of FIG. 7E includes a pick 781, corresponding to the first spacer portion 7051 and extending in a first direction, picks 782 and 783 corresponding to the third spacer portion 7053 and extending parallel to the first direction, and a pick 784, corresponding to the fifth spacer portion 7055 and extending orthogonal to the first direction. Any number of picks can be used and arranged in similar or different directions.

Various agitation member configurations can be used. FIGS. 8A-8K illustrate generally side views of examples of different agitation members. Agitation members can be formed using various materials (e.g., using metals such as stainless steel or aluminum, polymers such as polycarbonate, wood, or other materials), and agitation members can have various shape, size (length, width, thickness, etc.), weight, or rigidity characteristics. In some examples, agitation members can be formed using 14 gauge steel (e.g., about 0.075 inches (0.19 cm) thick) and can have radiused (rounded) edges or corners.

Figure 8A:
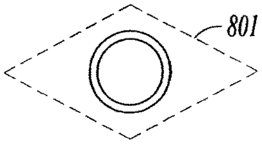
FIGS. 8A-8K illustrate generally side views of examples of agitation members.

FIG. 8A illustrates generally a first example of an agitation member 801 that has a diamond shape, such as described above in the discussion of FIGS. 3-6C. In an example, the agitation member 801 can have a least dimension of about 10.5 inches (26.7 cm) and a long-axis dimension of about 21 inches (53.3 cm), such as when the agitation member 801 is configured for use with strands that are about 7 inches (17.8 cm) in length.

Figure 8B:
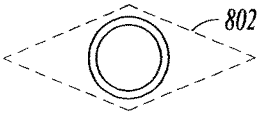

FIG. 8B illustrates generally a second example of an agitation member 802 that has a diamond shape. In this example, the agitation member 802 can have a least dimension that is less than the least dimension of the agitation member 801. For example, the agitation member 802 can have a least dimension of about 8 inches (20.3 cm).

Figure 8C:
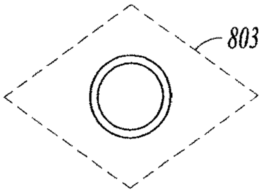
Figure 8D:
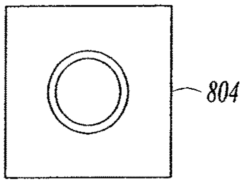
Figure 8E:
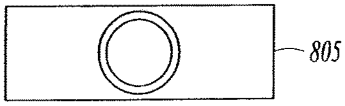
Figure 8F:
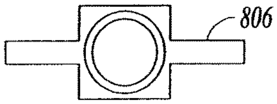

FIG. 8C illustrates generally a third example of an agitation member 803. The agitation member 803 can have a substantially rhomboid shape. FIG. 8D illustrates generally a fourth example of an agitation member 804 that has a substantially square shape. FIG. 8E illustrates generally a fifth example of an agitation member 805 that has a substantially rectangular shape, such as having a particular length to thickness ratio. FIG. 8F illustrates generally a sixth example of an agitation member 806 that has a substantially rectangular shape having a rectangular portion with a length to thickness ratio greater than that of the agitation member 805.

Figure 8G:
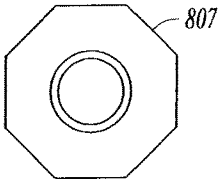
Figure 8H:
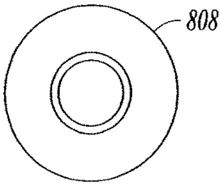
Figure 8I:
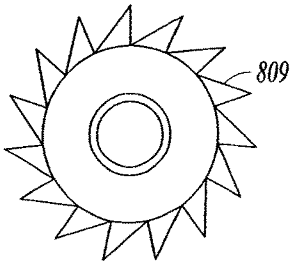
Figure 8J:
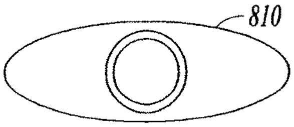
Figure 8K:
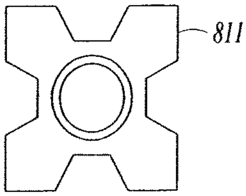

FIG. 8G illustrates generally a seventh example of an agitation member 807 that has a substantially octagonal shape. FIG. 8H illustrates generally an eighth example of an agitation member 808 that can be substantially circular. FIG. 8I illustrates generally a ninth example of an agitation member 809 that can be substantially circular and have a sawtooth or burred edge, such as can be configured to interfere with strands of a particular size. For example, a height of the sawtooth can correspond to a thickness or a width of a strand. FIG. 8J illustrates generally a tenth example of an agitation member 810 that can be substantially oval shaped. FIG. 8K illustrates generally an eleventh example of an agitation member 811 that can be substantially cross or "X" shaped. Other agitation member shapes can be used as well. Any number of differently sized or shaped agitation members can be used on one or more of the agitation roll assemblies. In some examples, the shaft size of an agitation roll assembly can be adjusted according to a size or weight of the agitation members. For example, smaller or less massive agitation members can be used with smaller diameter shafts. Agitation member dimensions can be selected such that agitation members of a particular agitation roll assembly do not interfere with agitation members or shafts of adjacent agitation roll assemblies.

The present inventors have recognized, among other things, that a variable affecting strand orientation and distribution in an orienter system using agitation members can be agitation member surface area. For example, adjacent agitation members with greater surface area can provide a longer guide channel for falling strands than is provided by agitation members with lesser surface area. Thus, agitation members with greater surface area can provide better alignment in some examples. The present inventors have further recognized that another variable can include an amount of strand agitation, or turbulence, provided by the agitation members. In some examples, agitation members that provide more agitation of the strands can produce a mat that has improved uniformity, such as in terms of strand distribution or density. In an example, an agitation member having a substantially square shape (see, e.g., FIG. 8D) can have a large surface area, but may not provide very aggressive agitation. In contrast, an agitation member having an elongated rectangular shape (see, e.g., FIG. 8F) can have a smaller surface area and may provide more aggressive agitation. In an example, an agitation member having a diamond shape (see, e.g., FIG. 8A) can provide a compromise between member surface area and aggressiveness of agitation.

Figure 9A:
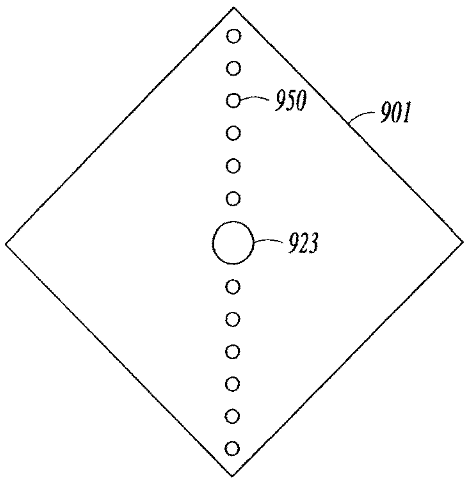
FIGS. 9A-9C illustrate generally side and top views of examples of an agitation members.
Figure 9B:
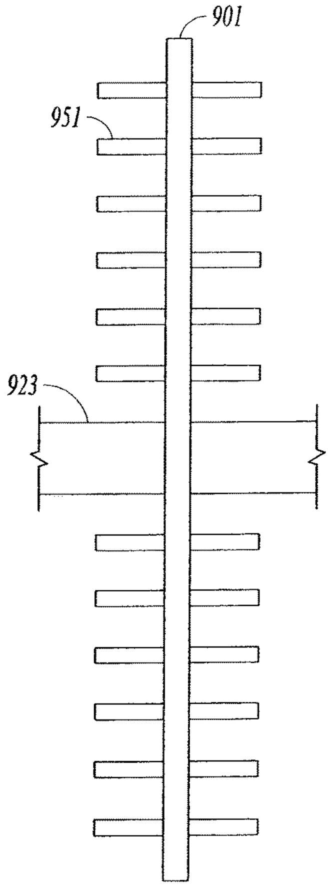
Figure 9C:
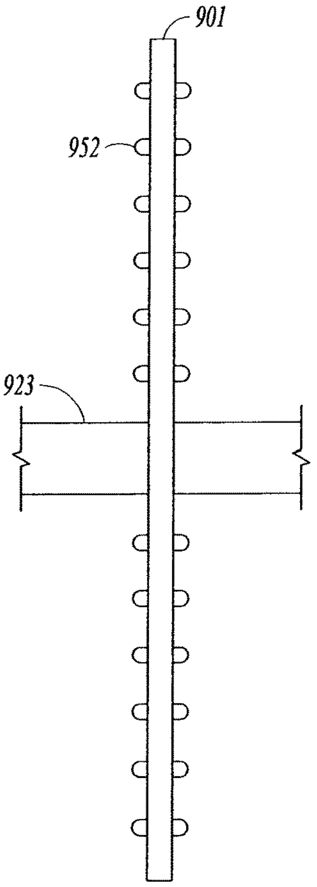

Some agitation members can have additional features to further agitate strands and/or to prevent strands from plugging or stacking in the orienter system 300. FIG. 9A illustrates generally a side view of an example of an agitation member 901 that includes additional agitation features 950. The agitation member 901 can be substantially rectangular, or can be shaped like one of the agitation members shown in FIGS. 8A-8K, among other shapes. The agitation member 901 can be used with a shaft 923 of an agitation roll assembly. The agitation features 950 can be disposed anywhere on the surface of the agitation member 901. In the example of FIGS. 9A-9C, the agitation features 950 are disposed along a diagonal axis of the agitation member 901.

FIG. 9B illustrates generally a top view (e.g., orthogonal to the view of FIG. 9A) of the agitation member 901. In this example, agitation features 951 correspond to the agitation features 950 of FIG. 9A. The agitation features 951 can include picks (e.g., similar to the picks illustrated in the example of FIGS. 7A and 7B, and as described above). The agitation features 951 can extend away from the agitation member 901, such as normal to the agitation member 901. The agitation features 951 can have different lengths or widths, however the agitation features 951 are each shown in the example of FIG. 9A as having the same length and width.

FIG. 9C illustrates generally a top view (e.g., orthogonal to the view of FIG. 9A) of the agitation member 901. In this example, agitation features 952 correspond to the agitation features 950 of FIG. 9A. The agitation features 952 can include protrusions that extend away from the agitation member 901. In an example, the agitation member 901 can be formed from a metal plate, and the agitation features 952 can be semi-spherical protrusions formed in the plate using a hydraulic press. The agitation features 952 can be differently sized or shaped, or can be uniformly sized and shaped.

Figure 10A:
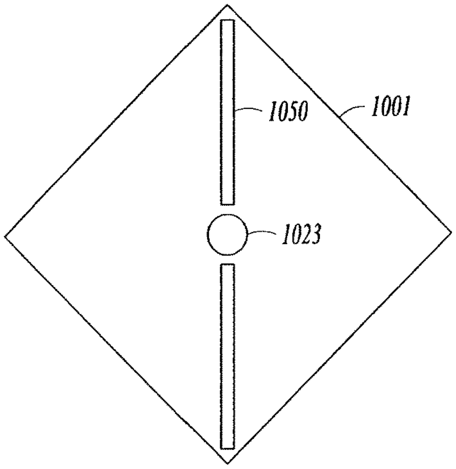
FIGS. 10A and 10B illustrate generally side and top views of an example of an agitation member.
Figure 10B:
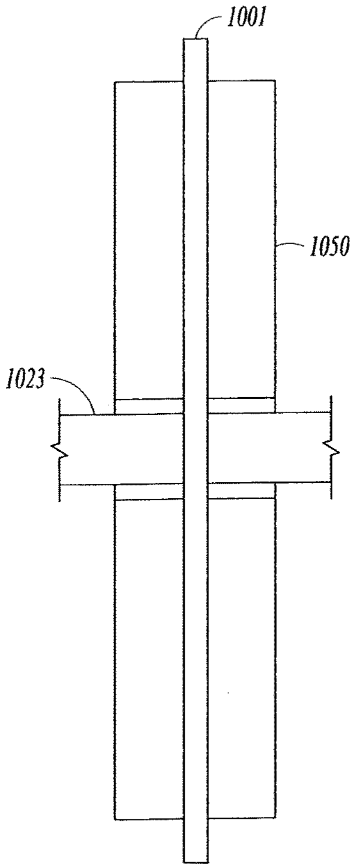

FIG. 10A illustrates generally a side view of an example of an agitation member 1001 that includes additional agitation features 1050. The agitation member 1001 can be substantially rectangular, or can be shaped like one of the agitation members shown in FIGS. 8A-8K, among other shapes. The agitation member 1001 can be used with a shaft 1023 of an agitation roll assembly. The agitation features 1050 can include blades, or wipers, disposed anywhere on the surface of the agitation member 1001. In the example of FIGS. 10A and 10B, the agitation features 1050 are disposed along a diagonal axis of the agitation member 1001.

FIG. 10B illustrates generally a top view (e.g., orthogonal to the view of FIG. 10A) of the agitation member 1001. In this example, agitation features 1050 include blades, or wipers, that extend away from the agitation member 1001, such as normal to the agitation member 1001. The agitation features 1050 can have different lengths or widths, however the agitation features 1050 are each shown in the example of FIG. 10A as having the same length and width. The agitation features 1050 can be rigid, or can be made from a flexible material.

Figure 11:
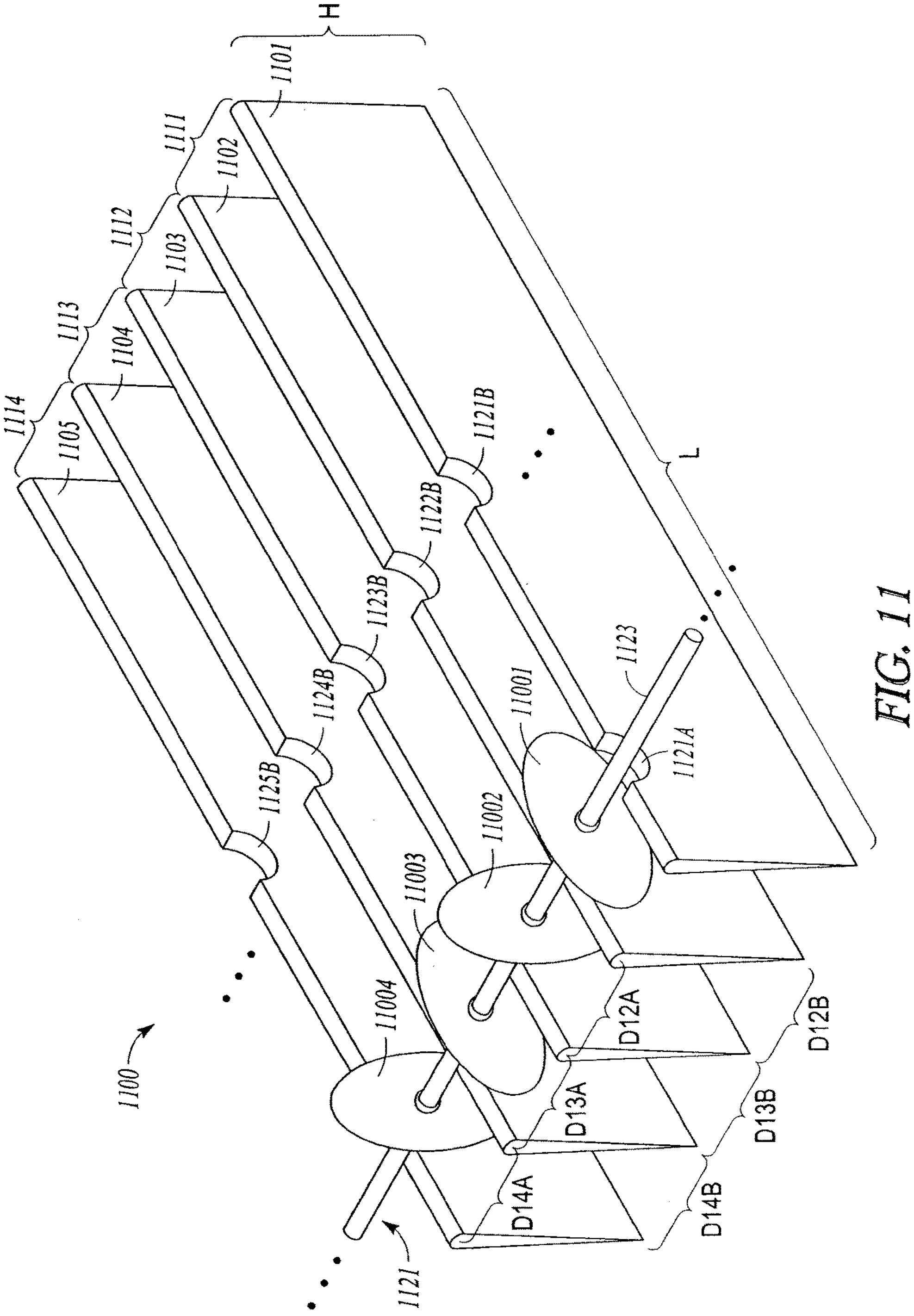
FIG. 11 illustrates generally a perspective view of an aligner portion of an orienter system.

As described above in the discussion of FIG. 3, the aligner portion 320 of the orienter system 300 includes the agitation member portion 326 and the vane set 325. FIG. 11 illustrates generally a perspective view of an example 1100 of the aligner portion 320. The example 1100 includes a portion of the vane set 325 and a portion of an agitation roll assembly 1121.

The example 1100 illustrates generally how adjacent agitation members on a shaft can be oriented in a staggered or alternating fashion. The example 1100 includes agitation members 11001, 11002, 11003, and 11004, disposed along a length of an agitation roll shaft 1123. In this example, the agitation members 11001, 11002, 11003, and 11004, correspond to the shape of the agitation member 810 illustrated in FIG. 8J. When the shaft 1123 is in a particular angular orientation, the first agitation member 11001 can be oriented with its least dimension substantially perpendicular to a long axis of the vane set 325 (e.g., perpendicular to a travel direction of the system). The second agitation member 11002, disposed adjacent to the first agitation member 11001, can be oriented with its least dimension substantially parallel to the long axis of the vane set 325 such that the second agitation member 11002 is offset from the first agitation member 11001 by about 90 degrees. The third agitation member 11003, disposed adjacent to the second agitation member 11002, can be oriented with its least dimension substantially perpendicular to the long axis of the vane set 325 such that the third agitation member 11003 is offset from the second agitation member 11002 by about 90 degrees, and substantially aligned with the first agitation member 11001.

In the example of FIG. 11, the agitation members 11001, 11002, etc. can correspond to unique chutes in the vane set 325. The illustrated portion of the vane set 325 can include a first partition 1101, a second partition 1102, a third partition 1103, a fourth partition 1104, and a fifth partition 1105, such as having common lengths L and heights H. A first inter-partition chute 1111 can be bound by the first and second partitions 1101 and 1102, a second inter-partition chute 1112 can be bound by the second and third partitions 1102 and 1103, and so on. In the example of FIG. 11, the first agitation member 11001 corresponds to the first inter-partition chute 1111, the second agitation member 11002 corresponds to the second inter-partition chute 1112, the third agitation member 11003 corresponds to the third inter-partition chute 1113, and the fourth agitation member 11004 corresponds to the fourth inter-partition chute 1114. Although the example of FIG. 11 shows adjacent agitation members of a particular agitation roll assembly corresponding to adjacent inter-partition chutes, in some examples, the agitation members can be separated such that adjacent agitation members of a particular agitation roll assembly correspond to fewer than every adjacent one of the inter-partition chutes (see, e.g., FIG. 4, where adjacent agitation members of a particular agitation roll assembly correspond to approximately every other one of the inter-partition chutes). In an example, an agitation member can extend into a chute by a distance that is less than the height H of one of the chute's sidewall partitions. In an example, an agitation member can extend beyond the extents of a chute, such as by extending into the chute a distance greater than the height H of the chute's partition.

In an example, central axes of the inter-partition chutes (e.g., vertical axes centered within the chutes) can be substantially equally spaced apart and parallel. In some examples, the inter-partition chutes can have sidewalls that are substantially parallel and vertical along their heights. In some example, inter-partition chutes can have sidewalls that are not parallel along their heights. For example, some inter-partition chutes can be wider or narrower at a top edge of the chutes than at a corresponding bottom edge. For example, the second inter-partition chute 1112 can have a width D12A at its top edge and a width D12B at its bottom edge. In an example, the width D12A can be less than the width D12B such that the second inter-partition chute can be substantially funnel shaped, such as having a wider opening at the bottom of the chute than at the top of the chute. In an example, the width D12A can be greater than the width D12B such that the second inter-partition chute can be substantially funnel shaped, such as with a narrower opening at the bottom of the chute than at the top of the chute. In some examples, all of the inter-partition chutes can be similarly sized and shaped. That is, each of the inter-partition chutes (e.g., each of inter-partition chutes 1111, 1112, 1113, and 1114) can be similarly funnel shaped. In some examples, some of the inter-partition chutes can be substantially funnel shaped with a wider opening near the top edge of the chutes, and some of the inter-partition chutes can be substantially funnel shaped with a wider opening near the bottom edge of the chutes. In the example of FIG. 11, the distances D12A, D13A, and D14A, between the top edges of adjacent partitions can each be greater the corresponding distances D12B, D13B, and D14B, between the bottom edges of the same partitions.

In an example, the vane set 325 can include partitions that are fixed, or stationary, relative to the agitation member portion 326. In an example, the vane set 325 can include one or more partitions that are movable relative to the agitation member portion 326. For example, the first partition 1101 can be movable, such as parallel and/or orthogonal to a machine direction. In an example, alternating ones of the partitions of the vane set 325 can be movable relative to the agitation member portion 326.

In the example of FIG. 11, the agitation roll shaft 1123 is aligned with an upper edge of the vane set 325. For example, the agitation roll shaft 1123 corresponds to the cutout 1121A in the first partition 1101, to a cutout 1122A (not labeled in FIG. 11) in the second partition 1102, and so on with cutouts in the other partitions. The cutouts 1121B, 1122B, 1123B, 1124B, and 1125B are configured to receive a shaft of a second roll assembly. See the above discussion of FIGS. 5A and 5B for further detail about partition cutouts configured to receive a roll assembly shaft.

Figure 12:
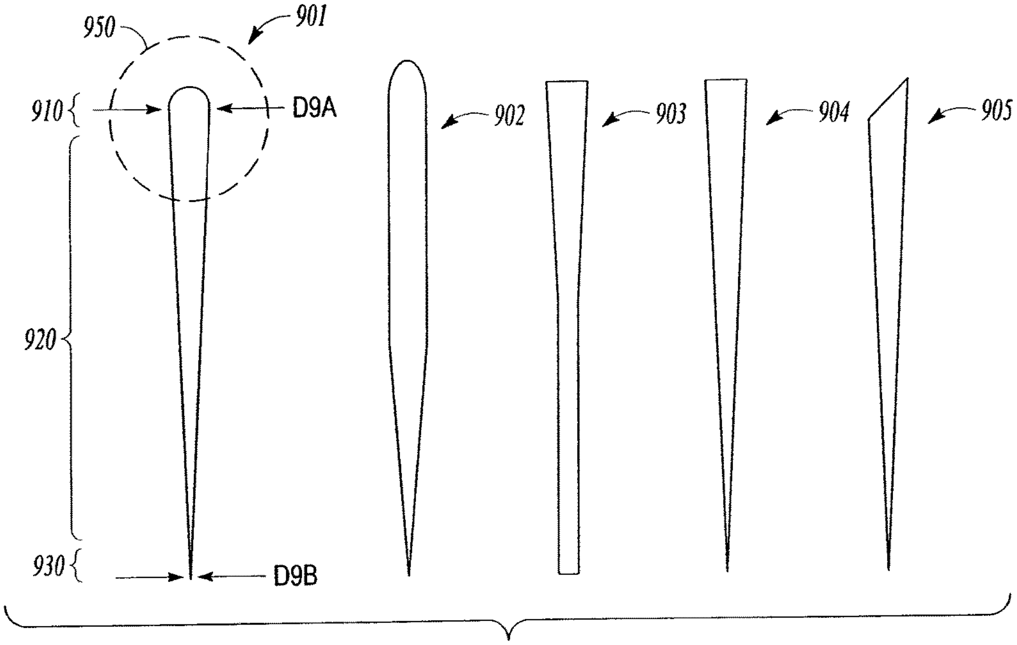
FIG. 12 illustrates generally cross sections of examples of vane set partitions.

FIG. 12 illustrates generally cross sections of several examples of vane set partition walls, such as can be used to form a partition in the vane set 325. For example, the first partition 401 in the example of FIG. 4 can have a cross section as shown in any of the examples 901, 902, 903, or 904, of FIG. 12. Other partition wall cross sections can similarly be used.

The example partition wall cross sections illustrated in FIG. 12 can be generally described as having an upper edge portion 910, a body portion 920, and a lower edge portion 930. In an example, the upper edge portion 910 can correspond to a side of the vane set 325 nearest the agitation member portion 326, and the lower edge portion 930 can correspond to a mat-side of the vane set 325. The upper edge portion 910 can correspond to an upper partition width D9A, and the lower edge portion 930 can correspond to a lower partition width D9B. Generally, a configuration of the upper edge portion 910 can be selected such that strands are prevented from coming to rest atop a partition.

In the example 901 of FIG. 12, the upper edge portion 910 can include a substantially rounded or hemispherical edge. Wood strands that encounter a rounded upper edge of a partition wall can be encouraged to "roll" off the upper edge and fall into one of the chutes on either side of the partition. The second example 902 illustrates generally an example having a more radiused upper edge portion 910 than in the first example 901, and the third example 903 illustrates generally an example having a less radiused upper edge portion 910 than in the first example 901. The fourth example 904 illustrates generally an example having a substantially planar upper edge portion 910. The configuration of the fourth example 904 can be selected for use, for example, when a strand width is substantially greater than the width of the upper edge 910 of the partition wall. The fifth example 905 illustrates generally an example having a slanted upper edge portion 910.

The body portion 920 of the example partition cross sections can be tapered substantially along the length of the body portion 920 (see, e.g., first and fourth examples 901 and 904), or along only a portion of the length of the body portion 920 (see, e.g., second and third examples 902 and 903). In the second and third examples 902 and 903, the body portions 920 can include tapered portions and non-tapered, or substantially parallel, portions.

The lower edge portions 930 of the partition cross sections can be substantially pointed or otherwise terminated. For example, the first, second, and fourth examples 901, 902, and 904, include lower edge portions 930 that are substantially pointed, such that the lower edge portion 930 is narrower than the upper edge portion 910. That is, the width D9A of an upper portion of a partition is greater than the width D9B of a lower portion of the partition. In the third example 903, the lower edge portion 930 is non-pointed, and the lower edge portion 930 is narrower than the upper edge portion 910. Various other combinations or shapes of the upper edge portion 910, body portion 920, and lower edge portion 930, can be used as well.

Figure 13:
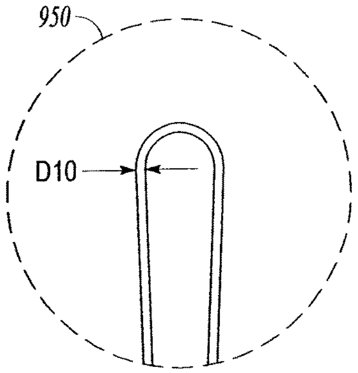
FIG. 13 illustrates generally a detail-section view of a portion of a vane set partition.

FIG. 13 illustrates generally a side view of an example portion 950 of a vane set partition wall. In some examples, partitions can be formed using various materials (e.g., metals such as stainless steel or aluminum, polymers such as polycarbonate, wood, or other materials), and can have various shape, size (length, width, thickness, etc.), weight, or rigidity characteristics. In the example of FIG. 13, the partition can be formed using a bent 16 gauge steel plate (e.g., D10 can be about 0.060 inches (0.16 cm)). In the example of FIG. 13, the width D9A of the upper portion of the partition can be about 0.25 inches (0.64 cm). In a vane set comprising multiple partition walls having the characteristics of the first example partition 901, the inter-partition chutes can have a top edge width of about 1.81 inches (4.60 cm) and a bottom edge width of about 1.94 inches (4.92 cm). Other chute configurations can be used as well.

Figure 14:
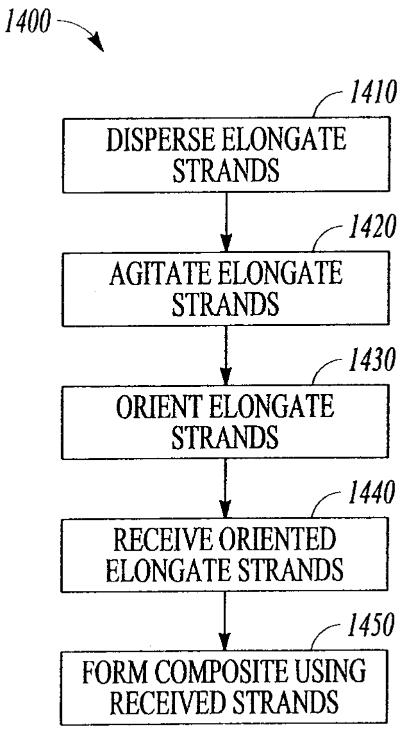
FIG. 14 illustrates generally an example that can include forming a composite using strands.

Various methods can be used to form a composite product using an orienter system, such as the orienter system 300 of FIG. 3. FIG. 14 illustrates generally an example 1400 that can include, at 1410, dispersing elongate strands; at 1420, agitating elongate strands; at 1430, orienting or commonly aligning elongate strands; at 1440 receiving substantially oriented or aligned elongate strands; and at 1450, forming a composite product.

At 1410, elongate strands can be dispersed into an orienter system, such as using the infeed portion 310 of the orienter system 300 illustrated in FIG. 3. The elongate strands can include elongate wood strands, or another stranded, non-wood material. In an example, the elongate strands can include wood strands that are less than about 8 inches (20.3 cm) long, less than about 1.8 inches (4.60 cm) wide, and less than about 0.1 inches (0.25 cm) thick. In an example, the strands can be dispersed into the orienter system 300 via the distribution roll 313, such as described above in the discussion of FIG. 3.

At 1420, the elongate strands dispersed into the orienter system (e.g., at 1410) can be agitated. The strands can be passively agitated, such as by falling from the distribution roll 313 toward the receiving portion 330. The strands can be actively agitated, such as using one or more agitation members in the agitation member portion 326, and/or using the vane set 325. At 1430, the elongate strands can be oriented. For example, the agitation of the strands, at 1420, can encourage the strands to commonly align, or orient, at 1430, such as by passing strands between agitation members in the agitation member portion 326 or between parallel partitions in the vane set 325. In an example, the agitation members in the agitation member portion 326 can be configured to rotate to actively encourage strands to fall between adjacent agitation members and/or between vane chutes below the agitation members. Various example configurations of the agitation member portion 326 and the vane set 325 are described above in the discussion of FIGS. 3-13. In an example, orienting the strands at 1430 can include passing the strands through multiple chutes in the vane set that are narrower on an upper, agitation member side of the vane set than on the opposite, mat side of the vane set.

At 1440, oriented or aligned elongate strands can be received. For example, the oriented strands can be received on the moving conveyor 335 to form a mat 350. The mat 350 can include multiple layers of strands. In some examples, the mat 350 includes layers of strands that are differently oriented. For example, a first layer of strands can be oriented in a direction of travel of the mat along the moving conveyor 335, and a second layer of strands atop the first layer can be oriented in a direction orthogonal to the direction of travel of the mat.

At 1450, a composite can be formed using the received strands. For example, where wood strands of a particular size are oriented using the orienter system 300, OSB or OSL can be formed at 1450 by heating and pressing a portion of the mat, such as to bond the strands together.

The example 1400 can be machine or computer-implemented, at least in part. For example, a control circuit can be provided to control one or more of the strand dispersion (e.g., at 1410), the strand agitation (e.g., at 1420), the strand orientation (e.g., at 1430), the strand receiving (e.g., at 1440), and the composite forming (e.g., at 1450). In an example, at 1410, the distribution roll 313 and/or the metering bin 311 can be controlled by a control signal issued by the control circuit, such as to control a rate at which the distribution roll 313 rotates. The control circuit can similarly be used to control one or more of the agitation roll assemblies or one or more agitation members disposed thereon, or to control a rate of the moving conveyor 335.

Various Notes & Examples

Example 1 can include subject matter such as a system for orienting elongate wood strands that can include or use a plurality of rotatable shafts that extend substantially perpendicular to a travel direction of a mat of the elongate wood strands, each rotatable shaft including axially spaced agitation members that extend radially away from the shaft, wherein the agitation members extend radially away from the shaft in a direction substantially parallel to the travel direction during at least a portion of the rotational travel of the shaft, and a vane set positioned vertically below a portion of at least one of the agitation members during at least a portion of the rotational travel of the shaft, and the vane set including substantially parallel partitions with openings therebetween. In Example 1, each partition of the vane set can have a length that is substantially parallel to the travel direction. In Example 1, at least one partition of the vane set can optionally have an upper edge thickness that is different than a lower edge thickness of the same partition.

Example 2 can include, or can optionally be combined with the subject matter of Example 1, to optionally include a portion of at least one of the agitation members positioned vertically above the vane set during at least a portion of the rotational travel of the shaft.

Example 3 can include, or can optionally be combined with the subject matter of one or any combination of Examples 1 or 2 to optionally include each of the axially spaced agitation members aligned with a vane set opening.

Example 4 can include, or can optionally be combined with the subject matter of Example 3, to optionally include each of the axially spaced agitation members on a first one of the plurality of rotatable shafts aligned with a different vane set opening.

Example 5 can include, or can optionally be combined with the subject matter of Example 3, to optionally include an agitation member width, measured perpendicular to the travel direction, that is less than a width of its corresponding aligned vane set opening, also measured perpendicular to the travel direction, such that at least a portion of the agitation member can be disposed in the vane set opening.

Example 6 can include, or can optionally be combined with the subject matter of one or any combination of Examples 1 through 5 to optionally include the plurality of rotatable shafts to be coplanar with and spaced apart along the travel direction of the mat of the elongate wood strands.

Example 7 can include, or can optionally be combined with the subject matter of Example 6, to optionally include a first shaft and a second shaft, wherein the axially spaced agitation members on the first shaft are offset from the axially spaced agitation members on the second shaft.

Example 8 can include, or can optionally be combined with the subject matter of one or any combination of Examples 1 through 7 to optionally include a first agitation member that extends radially away from the shaft in a first direction, and a second agitation member that extends radially away from the shaft in a different second direction.

Example 9 can include, or can optionally be combined with the subject matter of one or any combination of Examples 1 through 8 to optionally include a conveyor, operable in the travel direction, positioned vertically below the vane set.

Example 10 can include, or can optionally be combined with the subject matter of one or any combination of Examples 1 through 9 to optionally include substantially parallel partitions that are substantially evenly spaced along a length of the plurality of rotatable shafts.

Example 11 can include, or can optionally be combined with the subject matter of one or any combination of Examples 1 through 10 to optionally include a partition wherein the upper edge thickness of the partition is greater than about 3⁄16 inch and the lower edge thickness of the partition is less than about 3⁄16 inch.

Example 12 can include, or can optionally be combined with the subject matter of one or any combination of Examples 1 through 11 to optionally include each of the substantially planar partitions having an upper edge thickness that is greater than a corresponding lower edge thickness such that an opening width between opposing faces of adjacent partitions is greater along a bottom portion of the adjacent partitions than along a top portion of the same adjacent partitions.

Example 13 can include, or can optionally be combined with the subject matter of one or any combination of Examples 1 through 12 to optionally include a vane set with a partition having a rounded upper edge.

Example 14 can include, or can optionally be combined with the subject matter of one or any combination of Examples 1 through 13 to optionally include at least one agitation member that extends radially away from a shaft by a first distance, and wherein at least one of the substantially parallel partitions vertically extends a second distance that is greater than or equal to the first distance.

Example 15 can include, or can optionally be combined with the subject matter of one or any combination of Examples 1 through 14 to optionally include at least two agitation members that are differently sized or shaped.

Example 16 can include, or can optionally be combined with the subject matter of one or any combination of Examples 1 through 15 to optionally include at least two agitation members that are substantially identically sized and shaped.

Example 17 can include or use subject matter such as a method that can include dispersing elongate strands about an infeed portion of an orienter, agitating the elongate strands using a mixing portion of the orienter, including passing the elongate strands through multiple substantially parallel agitation members axially disposed along a rotatable shaft, which is positioned vertically offset from the infeed portion of the orienter, and orienting the elongate strands, including passing the elongate strands through multiple elongate chutes arranged parallel to a travel direction of the orienter and vertically offset from the multiple agitation members, wherein passing the elongate strands through the multiple elongate chutes comprises passing the elongate strands through multiple elongate chutes that are narrower on an upper, agitation member-side than on a lower side.

Example 18 can include, or can optionally be combined with the subject matter of Example 17, to optionally include receiving, on a movable conveyor, the elongate strands from the multiple elongate chutes, and producing an oriented strand wood product by bonding the received elongate strands using heat and pressure.

Example 19 can include, or can optionally be combined with the subject matter of one or any combination of Examples 17 or 18, to optionally include passing the elongate strands through agitation members axially disposed along multiple rotatable shafts, which are coplanar and positioned vertically above the multiple elongate chutes.

Example 20 can include, or can optionally be combined with the subject matter of Example 19, to optionally include using agitation members on a first rotatable shaft and agitation members on a second rotatable shaft, wherein the agitation members on the second rotatable shaft are offset from the agitation members on the first rotatable shaft.

Example 21 can include subject matter such as a wood strand orientation apparatus that can include or use an infeed portion configured to receive multiple wood strands and including a distribution roll, the distribution roll configured to disperse the wood strands across a width of the infeed portion, an aligner portion including multiple parallel rotatable shafts, which are spaced apart in a plane and have multiple axially-spaced agitation members, and a vane set including multiple spaced apart and substantially vertical partitions, which define inter-partition chutes having a narrower upper width than lower width, and a strand receiving portion including a conveyor, positioned vertically below the vane set, movable in a travel direction that is substantially parallel to a length of the partitions.

Each of the above non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for orienting elongate wood strands, comprising:

a plurality of rotatable shafts that extend substantially perpendicular to a travel direction of a mat of the elongate wood strands, each rotatable shaft including axially spaced agitation members that extend radially away from the shaft; and a vane set positioned vertically below a portion of at least one of the agitation members and the vane set including substantially parallel and stationary partitions with openings therebetween;

wherein each partition of the vane set has a length that is substantially parallel to the travel direction; and wherein at least one stationary partition of the vane set has an upper edge thickness that is greater than a lower edge thickness of the same stationary partition such that an opening width between opposing faces of the at least one stationary partition and an adjacent partition is greater at a lower portion of the partitions than at an upper portion of the same partitions.

2. The system of claim 1, wherein a portion of at least one of the agitation members is positioned vertically above the vane set.

3. The system of claim 1, wherein each of the axially spaced agitation members is aligned with a vane set opening.

4. The system of claim 3, wherein each of the axially spaced agitation members on a first one of the plurality of rotatable shafts is aligned with a different vane set opening.

5. The system of claim 3, wherein an agitation member width, measured perpendicular to the travel direction, is less than a width of its corresponding aligned vane set opening, also measured perpendicular to the travel direction, such that at least a portion of the agitation member can be disposed in the vane set opening.

6. The system of claim 1, wherein the plurality of rotatable shafts have respective axes that are coplanar and are spaced apart along the travel direction of the mat of the elongate wood strands.

7. The system of claim 6, wherein the plurality of rotatable shafts include a first shaft and a second shaft, and wherein the axially spaced agitation members on the first shaft are offset from the axially spaced agitation members on the second shaft.

8. The system of claim 1, wherein the multiple agitation members include a first agitation member that extends radially away from the shaft in a first direction, and a second agitation member that extends radially away from the shaft in a different second direction.

9. The system of claim 1, further comprising a conveyor, operable in the travel direction, positioned vertically below the vane set.

10. The system of claim 1, wherein the substantially parallel partitions are substantially evenly spaced along a length of the plurality of rotatable shafts.

11. The system of claim 1, wherein the upper edge thickness of the at least one stationary partition of the vane set is greater than about $3/16$ inch and the lower edge thickness of the at least one stationary partition of the vane set is less than about $3/16$ inch.

12. The system of claim 1, wherein each of the substantially parallel and stationary partitions has an upper edge thickness that is greater than a corresponding lower edge thickness such that an opening width between opposing faces of adjacent partitions is greater at a lower portion of the adjacent partitions than at an upper portion of the same adjacent partitions.

13. The system of claim 1, wherein the vane set includes a partition having a rounded upper edge.

14. The system of claim 1, wherein at least one of the agitation members extends radially away from the shaft by a first distance, and wherein at least one of the substantially parallel partitions vertically extends a second distance that is greater than or equal to the first distance.

15. The system of claim 1, wherein at least two of the multiple agitation members are differently sized or shaped.

16. The system of claim 1, wherein at least two of the multiple agitation members are substantially identically sized and shaped.

17. A method comprising:

dispersing elongate strands about an infeed portion of an orienter;

agitating the elongate strands using a mixing portion of the orienter, including passing the elongate strands through multiple substantially parallel agitation members axially disposed along a rotatable shaft, the mixing portion being vertically offset from the infeed portion of the orienter; and orienting the elongate strands, including passing the elongate strands through multiple, stationary elongate chutes arranged parallel to a travel direction of a conveyor of the orienter and vertically offset from the multiple agitation members, wherein the passing the elongate strands through the multiple elongate chutes comprises passing the elongate strands through multiple elongate chutes that are narrower on an upper, agitation member-side than on a lower side.

18. The method of claim 17, further comprising:

receiving, on the conveyor, the elongate strands from the multiple elongate chutes; and producing an oriented strand wood product by bonding the received elongate strands using heat and pressure.

19. The method of claim 17, wherein agitating the elongate strands includes passing the elongate strands through agitation members axially disposed along multiple rotatable shafts, the rotatable shafts being coplanar and positioned vertically above the multiple elongate chutes.

20. The method of claim 19, wherein the passing the elongate strands through the agitation members axially disposed along the multiple rotatable shafts includes using agitation members on a first rotatable shaft and agitation members on a second rotatable shaft, wherein the agitation members on the first rotatable shaft correspond to first ones of the multiple, stationary elongate chutes, and wherein the agitation members on the second rotatable shaft are offset from the agitation members on the first rotatable shaft and correspond to different second ones of the multiple stationary elongate chutes.

21. A wood strand orientation apparatus comprising:

an infeed portion configured to receive multiple wood strands and including a distribution roll, the distribution roll configured to disperse the wood strands across a width of the in feed portion;

an aligner portion including multiple parallel rotatable shafts, which are spaced apart in a plane and have multiple axially-spaced agitation members, and a vane set including multiple spaced apart and substantially vertical partitions, which define inter-partition chutes having a narrower upper width than lower width; and a strand receiving portion including a conveyor, positioned vertically below the vane set, movable in a travel direction that is substantially parallel to a length of the partitions.

* * * * *